(12) United States Patent
Lim et al.

(10) Patent No.: US 11,773,972 B2
(45) Date of Patent: Oct. 3, 2023

(54) TRANSMISSION APPARATUS FOR ELECTRIC VEHICLE

(71) Applicant: NEOOTO CO., LTD., Seoul (KR)

(72) Inventors: Dong Hoon Lim, Chungcheongnam-do (KR); Duk Soon Choi, Chungcheongnam-do (KR); Sun Hyun Kim, Seoul (KR)

(73) Assignee: NEOOTO CO., LTD., Seoul (KR)

( * ) Notice: Subject to any disclaimer, the term of this patent is extended or adjusted under 35 U.S.C. 154(b) by 0 days.

(21) Appl. No.: 18/070,431

(22) Filed: Nov. 28, 2022

(65) Prior Publication Data
US 2023/0167897 A1 Jun. 1, 2023

(30) Foreign Application Priority Data
Nov. 30, 2021 (KR) .......................... 10-2021-0169489

(51) Int. Cl.
*F16H 63/00* (2006.01)
*F16H 63/30* (2006.01)
*F16H 63/32* (2006.01)

(52) U.S. Cl.
CPC ........... *F16H 63/304* (2013.01); *F16H 63/32* (2013.01); *F16H 2063/3059* (2013.01); *F16H 2063/3066* (2013.01)

(58) Field of Classification Search
CPC .................. F16H 63/304; F16H 63/32; F16H 2063/3059; F16H 2063/3066; F16H 2063/3063; F16H 25/20; F16H 2061/2884; F16H 2025/2075; F16H 63/3466

USPC .................. 74/89.14, 473.37, 89.23, 365
See application file for complete search history.

(56) References Cited

U.S. PATENT DOCUMENTS

| | | | | |
|---|---|---|---|---|
| 4,449,416 A * | 5/1984 | Huitema | ............... | F16H 63/304 74/DIG. 7 |
| 4,498,350 A * | 2/1985 | Ross | ..................... | F16H 63/304 74/89.42 |
| 5,205,179 A * | 4/1993 | Schneider | ............. | F16H 63/304 74/424.89 |
| 5,219,391 A * | 6/1993 | Edelen | .................... | F16H 61/32 74/403 |

(Continued)

FOREIGN PATENT DOCUMENTS

KR 20010059321 7/2001
KR 100345117 7/2002

*Primary Examiner* — Victor L MaCarthur
(74) *Attorney, Agent, or Firm* — JCIPRNET

(57) ABSTRACT

The present disclosure provides a transmission apparatus for an electric vehicle. The transmission apparatus for the electric vehicle includes a synchronization device connected to an input shaft, and a first shift device selectively engaged with the synchronization device to perform a gear shift operation, wherein the first shift device includes a first shift motor configured to receive power from the outside of the transmission apparatus and rotate, a first rotation shaft connected to the first shift motor to rotate about a rotation axis according to forward and reverse rotations of the first shift motor, a first movement block moving forward and backward in conjunction with the first rotation shaft, and a first shift fork connected to the first movement block to move integrally, and the synchronization device selectively operates to shift a gear as the first shift fork moves.

1 Claim, 5 Drawing Sheets

(56) References Cited

U.S. PATENT DOCUMENTS

| | | | | |
|---|---|---|---|---|
| 5,743,143 | A * | 4/1998 | Carpenter | F16H 59/70 |
| | | | | 324/207.16 |
| 5,832,777 | A * | 11/1998 | Weilant | F16H 63/24 |
| | | | | 74/335 |
| 5,878,624 | A * | 3/1999 | Showalter | F16H 63/304 |
| | | | | 74/473.19 |
| 7,350,432 | B2 * | 4/2008 | Somschor | F16H 61/32 |
| | | | | 74/335 |
| 8,627,739 | B2 * | 1/2014 | Tooman | F16H 63/3023 |
| | | | | 74/473.36 |
| 10,113,641 | B2 * | 10/2018 | Kang | F16H 37/122 |
| 11,054,029 | B2 * | 7/2021 | Cho | F16H 63/3466 |
| 2020/0370646 | A1 * | 11/2020 | Trinh | F16H 63/304 |
| 2021/0239209 | A1 * | 8/2021 | Park | F16H 25/2204 |

* cited by examiner

TRANSMISSION APPARATUS FOR ELECTRIC VEHICLE

CROSS-REFERENCE TO RELATED APPLICATION

This application is based on and claims priority under 35 U.S.C. § 119 to Korean Patent Application No. 10-2021-0169489, filed on Nov. 30, 2021, in the Korean Intellectual Property Office, the disclosure of which is incorporated by reference herein in its entirety.

BACKGROUND

1. Field

The present disclosure relates to a transmission apparatus for an electric vehicle.

2. Description of the Related Art

The general method of transferring a shift folk by a transmission apparatus includes a manual operation method by a linkage structure using a lever ratio and a motor-based transfer method performed by an actuator.

The motor-based transfer method performed by the actuator converts a rotational motion of a motor into a linear motion to transfer the shift fork, and a method using a screw, such as a combination of male and female lead screws or ball screws, is widely used.

The structure is simple, but there is a limit to a size of the screw, and thus, the structure is not suitable for a transmission for an electric vehicle that requires a large amount of force to change a speed. In addition, the combination of male and female lead screw or ball screws has a low frictional force to cause a reverse phenomenon, which may cause a gear to fall out. In addition, the lead screws and the ball screws have a problem in that there is a poor transfer (axis misalignment) of a shift fork due to a gap between a ball and a screw.

SUMMARY

The present disclosure provides a transmission apparatus that may stably perform a gear shift operation and may be applied to a transmission for an electric vehicle.

However, the object is an example, and objects to be achieved by the present disclosure are not limited thereto.

Additional aspects will be set forth in part in the description which follows and, in part, will be apparent from the description, or may be learned by practice of the presented embodiments of the disclosure.

According to an aspect of the present disclosure, a transmission apparatus for an electric vehicle includes a synchronization device connected to an input shaft, and a first shift device selectively engaged with the synchronization device to perform a gear shift operation, wherein the first shift device includes a first shift motor configured to receive power from the outside of the transmission apparatus and rotate, a first rotation shaft connected to the first shift motor to rotate about a rotation axis according to forward and reverse rotations of the first shift motor, a first movement block moving forward and backward in conjunction with the first rotation shaft, and a first shift fork connected to the first movement block to move integrally, and the synchronization device selectively operates and shifts as the first shift fork moves.

In the transmission apparatus, the first rotation shaft may include a worm gear having a gear on an outer circumferential surface of the first rotation shaft, and the first movement block includes a rack gear having a gear engaged with a gear of the first rotation shaft.

The transmission apparatus may further include a second shift motor configured to receive power from the outside of the transmission apparatus and rotate, a second rotation shaft connected to the second shift motor to rotate about a rotation axis according to forward and reverse rotations of the second shift motor, a second movement block moving forward and backward in conjunction with the second rotation shaft, and a second shift fork connected to the second movement block to move integrally, wherein the second shift device may operate independently of the first shift device.

In the transmission apparatus, the second rotation shaft may include a worm gear having a gear on an outer circumferential surface of the second rotation shaft, and the second movement block may include a rack gear having a gear engaged with a gear of the second rotation shaft.

The transmission apparatus may further include a shift rail that connects the first shift fork to the second shift fork and is parallel to the first rotation shaft and the second rotation shaft.

Other aspects, features, and advantages other than those described above will become apparent from the following drawings, claims, and detailed descriptions.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
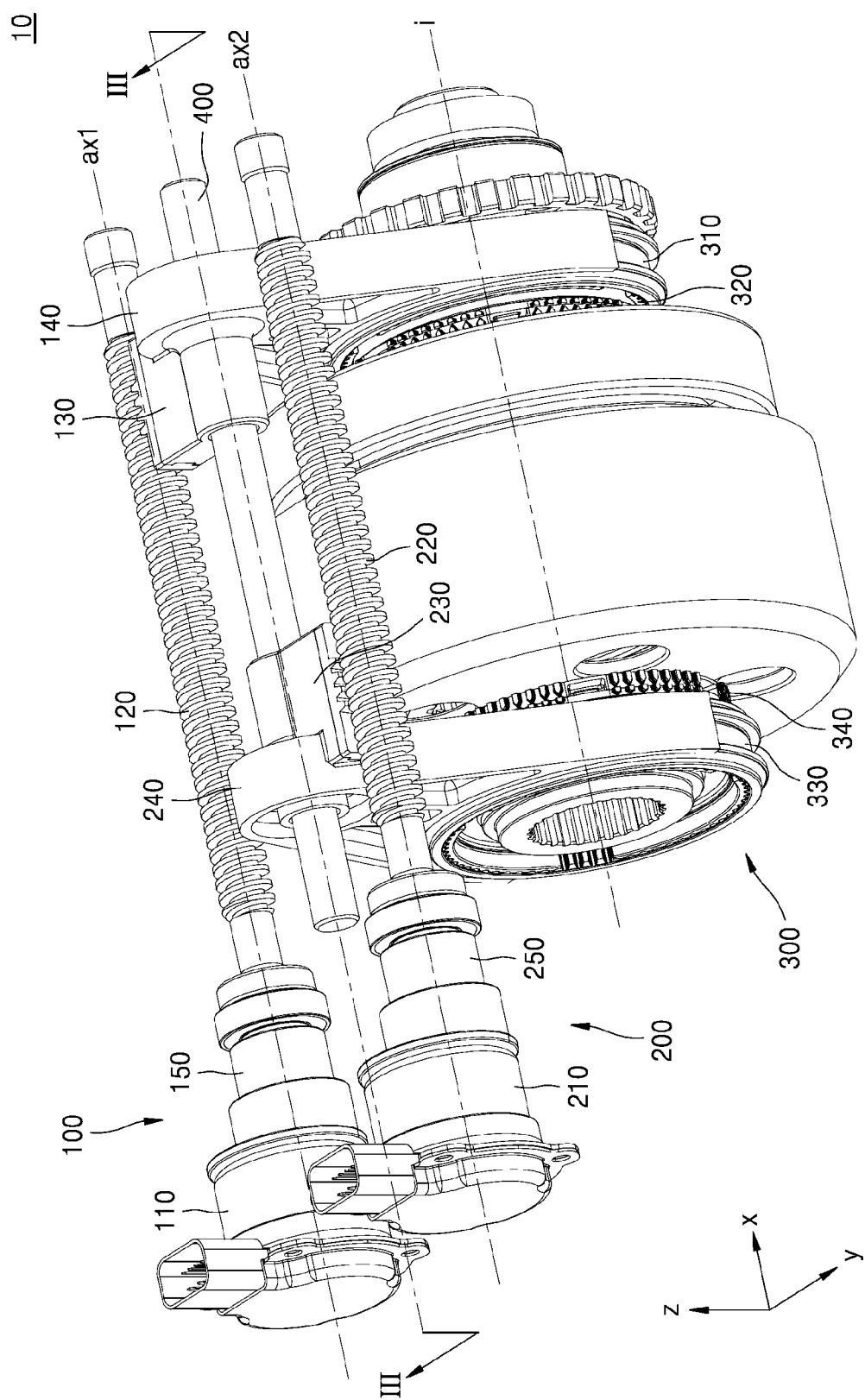
FIG. 1 illustrates a transmission apparatus for an electric vehicle according to an embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The present disclosure may be variously modified and may have various embodiments, and thus, various embodiments may be illustrated in the drawings and described in detail in the descriptions of the present disclosure. However, this does not limit the present disclosure to the various embodiments, and it should be understood to include all modifications, equivalents, and substitutes included in the idea and scope of the present disclosure. In describing the present disclosure, even though the same components are illustrated in other embodiments, the same identification numbers are used for the same components.

Hereinafter, embodiments of the present disclosure will be described in detail with reference to the accompanying drawings, and when described with reference to the drawings, the same or corresponding components are given the same reference numerals, and redundant descriptions thereof are omitted.

In the following embodiments, terms such as first and second are used for the purpose of distinguishing one component from another component, not in a limiting sense.

In the following embodiments, the singular expression includes the plural expression unless the context clearly dictates otherwise.

In the following embodiments, terms such as include or have means that features or components described in the specification exist, and a possibility that one or more other features or components will be added is not excluded in advance.

In the drawings, sizes of the components may be exaggerated or reduced for the sake of convenience of description. For example, sizes and thicknesses of the components illustrated in the drawings are randomly indicated for the sake of convenience of description, and thus, the present disclosure is not limited to the illustration.

In the following embodiments, an x axis, an y axis, and a z axis are not limited to three axes on the Cartesian coordinate system and may be interpreted in a broad sense including the axes. For example, the x axis, the y axis, and the z axis may be orthogonal to each other, but may refer to different directions that are not orthogonal to each other.

When certain embodiments are otherwise practicable, a certain process sequence may be performed differently from the described sequence. For example, two processes described in succession may be performed simultaneously or may be performed in an order opposite to the order previously described.

Figure 2:
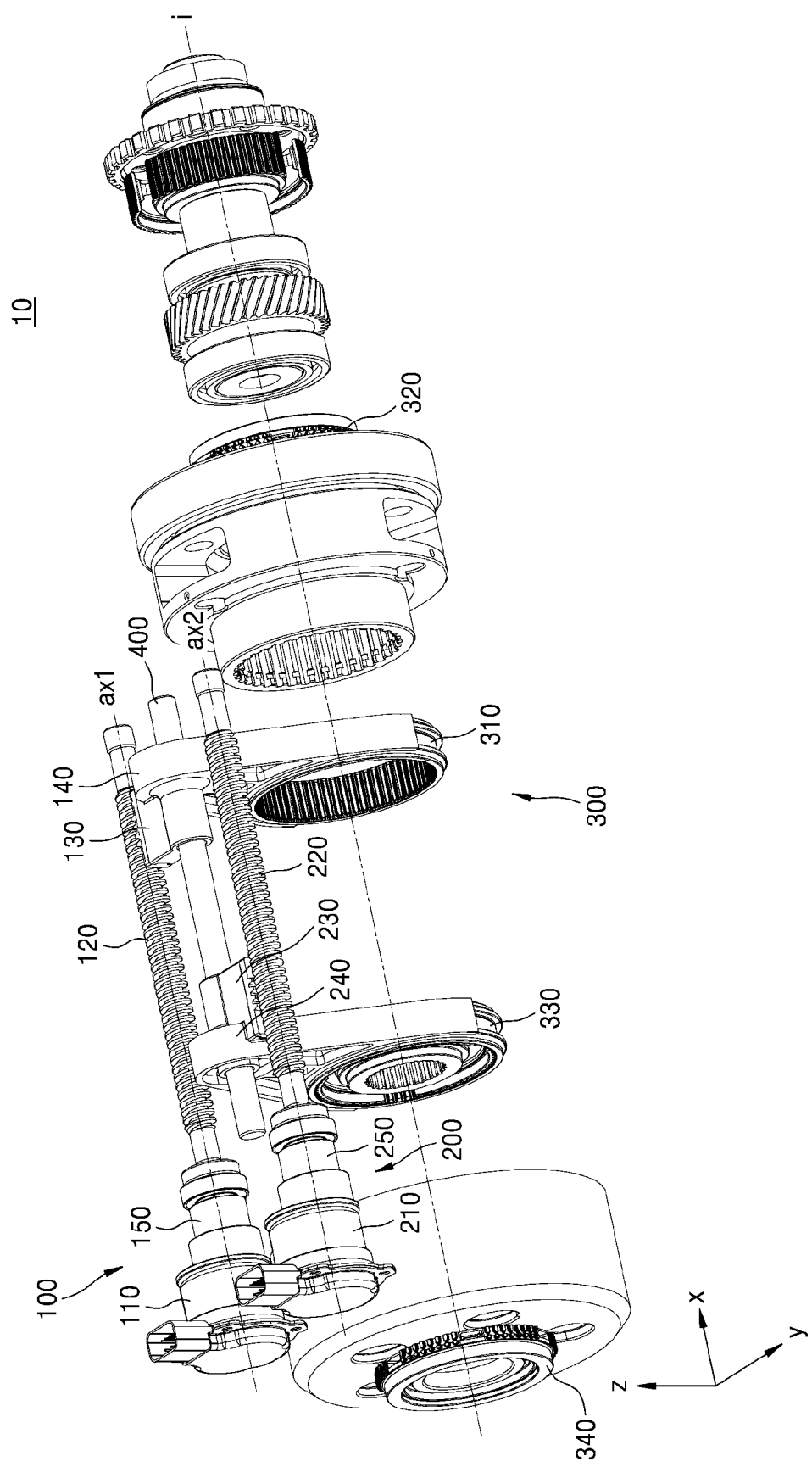
FIG. 2 is an exploded perspective view of a transmission apparatus for an electric vehicle according to an embodiment of the present disclosure.
Figure 3:
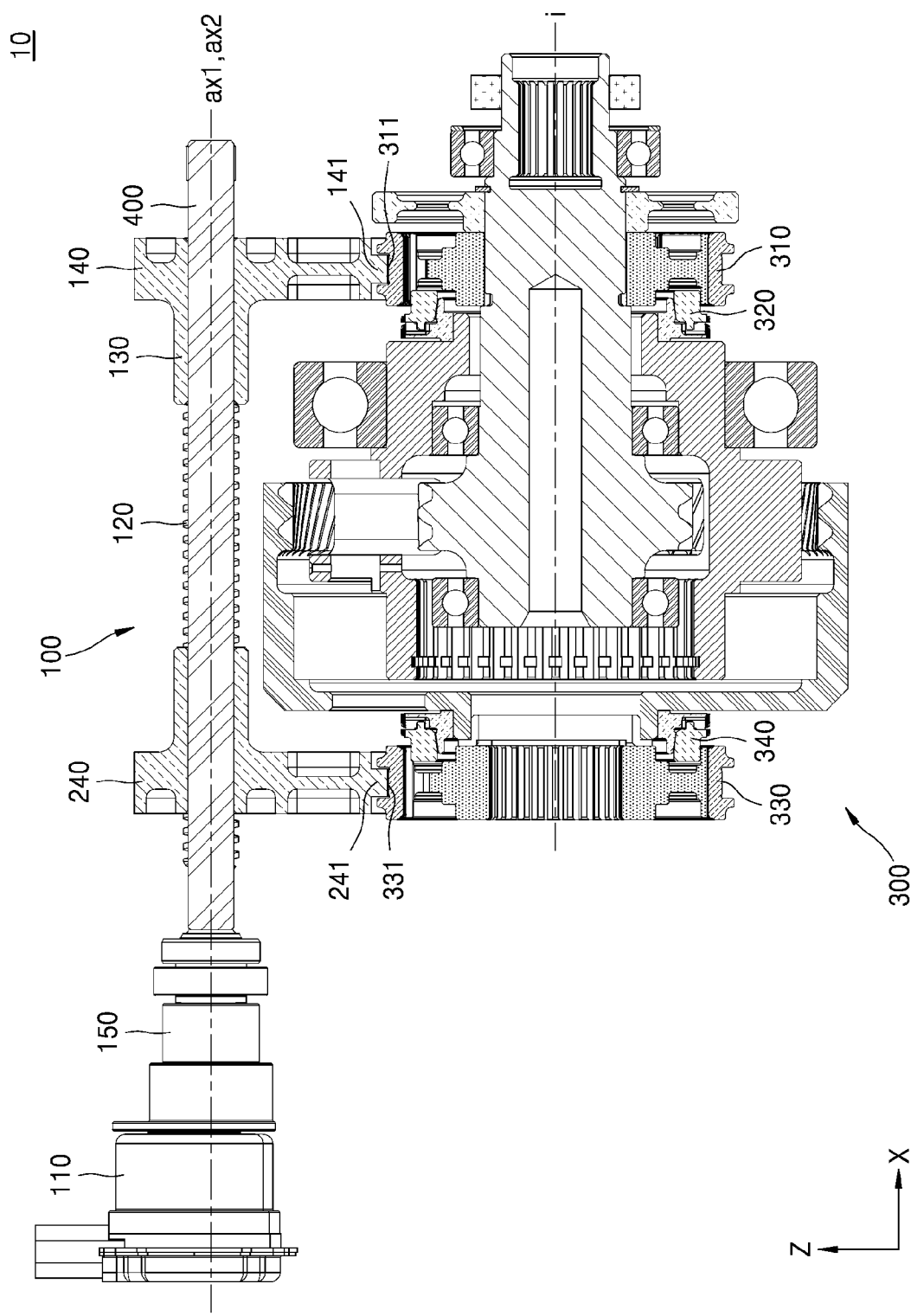
FIG. 3 illustrates a cross section taken along line III-III of FIG. 1.
Figure 4:
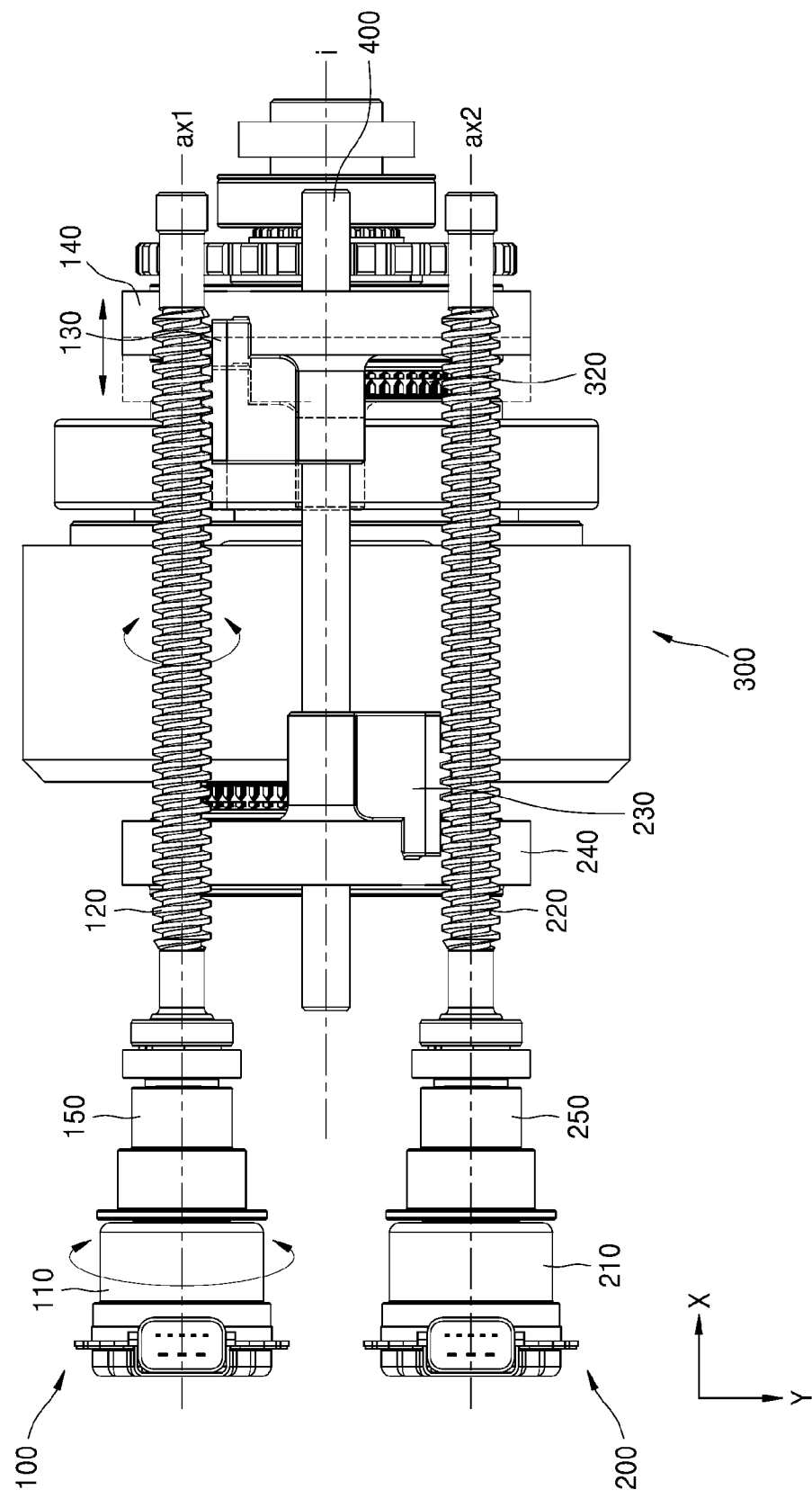
FIGS. 4 and 5 illustrate operation states of a transmission apparatus for an electric vehicle according to an embodiment of the present disclosure.
Figure 5:
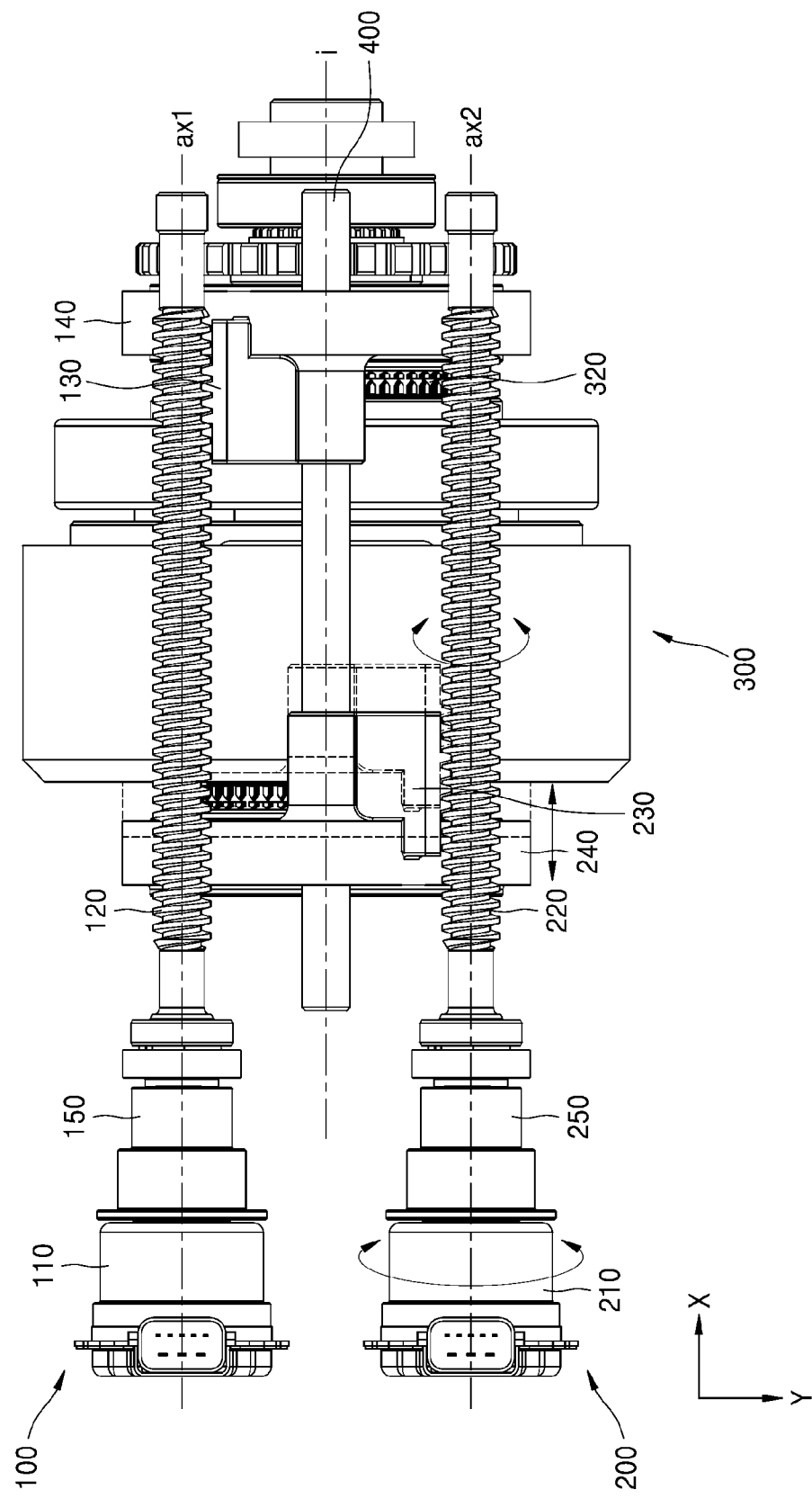

FIG. 1 illustrates a transmission apparatus 10 for an electric vehicle according to an embodiment of the present disclosure, FIG. 2 is an exploded perspective view of the transmission apparatus 10 for an electric vehicle according to an embodiment of the present disclosure, FIG. 3 illustrates a cross section taken along line III-III of FIG. 1, and FIGS. 4 and 5 illustrate operation states of the transmission apparatus 10 for an electric vehicle according to an embodiment of the present disclosure.

Referring FIGS. 1 and 2, the transmission apparatus 10 for an electric vehicle (hereinafter, also referred to as a "transmission apparatus 10") according to an embodiment of the present disclosure is a transmission apparatus used in an electric vehicle and may be a transmission apparatus with multi-stage gear of a second gear or more. In one embodiment, the transmission apparatus 10 may include a first shift device 100, a second shift device 200, and a synchronization device 300.

The first shift device 100 may receive a power from the outside of the transmission apparatus 10 to engage with the synchronization device 300, and accordingly, a gear shift operation is performed.

In one embodiment, the first shift device 100 may include a first shift motor 110, a first rotation shaft 120, a first movement block 130, a first shift fork 140, and a first decelerator 150.

The first shift motor 110 receives power from the outside of the transmission apparatus 10 and rotates to engage the first shift device 100 with the synchronization device 300 to perform a gear shift operation. For example, as illustrated in FIGS. 1 and 2, the first shift motor 110 includes a connection pin for being connected to an external power source on one side of the first shift motor 110, and the other side of the first shift motor 110 is connected to the first rotation shaft 120. Accordingly, when the first shift motor 110 receives power and rotates, the first rotation shaft 120 connected to the first shift motor 110 also rotates.

In one embodiment, one or more bearings may be arranged on an outer circumferential surface of the first shift motor 110.

The first rotation shaft 120 is connected to the first shift motor 110 and rotates about a rotation axis according to forward and reverse rotations of the first shift motor 110. For example, as illustrated in FIGS. 1 and 2, the first rotation shaft 120 may extend along a rotation axis ax1, and one end of the first rotation shaft 120 may be connected to the first shift motor 110. When the first shift motor 110 rotates clockwise or counterclockwise, the first rotation shaft 120 connected thereto may also rotate in the same direction.

In one embodiment, a gear may be formed in an outer circumferential surface of the first rotation shaft 120. For example, as illustrated in FIGS. 1 and 2, the first rotation shaft 120 may include a worm gear including a gear helically extending on the outer circumferential surface of the first rotation shaft 120. The gear of the first rotation shaft 120 may be engaged with a gear of the first movement block 130.

In one embodiment, the first rotation shaft 120 may rotate while connected to the first shift motor 110 but may not perform a translational motion. Accordingly, the first rotation shaft 120 may rotate clockwise or counterclockwise about the rotation axis ax1 without moving in a longitudinal direction, that is, a direction of the rotation axis ax1.

The first movement block 130 may be in contact with the first rotation shaft 120. For example, as illustrated in FIGS. 1 and 2, the first movement block 130 may protrude from one side of the first shift fork 140 toward the first rotation shaft 120. More specifically, the first movement block 130 may be on an upper portion of the first shift fork 140 and may have a block shape protruding to one side from the first shift fork 140.

In one embodiment, a gear may be formed on one surface of the first movement block 130. For example, the first movement block 130 is a rack gear and may include a gear to be engaged with a gear of the first rotation shaft 120 on a surface facing the first rotation shaft 120. Accordingly, when the first rotation shaft 120 rotates clockwise or counterclockwise, the first movement block 130 may move forward and backward along an axis parallel to the rotation axis ax1. In addition, the first shift fork 140 connected to the first movement block 130 may be engaged with or released from the synchronization device 300 while moving forward and backward in the same direction.

The first shift fork 140 performs a gear shift operation in conjunction with the synchronization device 300 while moving forward and backward according to operations of the first rotation shaft 120 and the first movement block 130. For example, as illustrated in FIGS. 1 and 2, the first shift fork 140 may have a Y shape, one side of the first shift fork 140 may be connected to the first movement block 130, and the other side of the first shift fork 140 may be connected to the first sleeve 310 of the synchronization device 300.

Accordingly, when the first rotation shaft 120 rotates in one direction, the first movement block 130 moves in the +x-axis direction or the −x-axis direction, and the first shift fork 140 also moves in the same direction. As the first shift fork 140 moves in the −x-axis direction, the first sleeve 310 supported by the first shift fork 140 is engaged with a first shift gear 320 of the synchronization device 300, and accordingly, the gear shift operation is completed. When the first movement block 130 moves in an opposite direction again, the first sleeve 310 is separated from the synchronization device 300, and accordingly, the transmission state is terminated.

The first decelerator 150 may be mounted in the first shift motor 110. The first decelerator 150 may decrease a rotation speed of the first shift motor 110 to increase an output torque. Accordingly, an engagement force between the first rotation shaft 120 and the first movement block 130 may increase, and the first shift fork 140 may be accurately transferred.

The second shift device 200 is adjacent to the first shift device 100 and receives power from the outside of the transmission apparatus 10 to perform a gear shift operation similarly to the first shift device 100. The second shift device 200 may operate independently of the first shift device 100 and may include a second shift motor 210, a second rotation shaft 220, a second movement block 230, a second shift fork 240, and a second decelerator 250 similarly to the first shift device 100. In addition, the second shift device 200 may perform a second-gear shift operation together with the first shift device 100.

Unless otherwise described, the second shift device 200 may have the same configuration as the configuration of the first shift device 100, and a differences between the first shift device 100 and the second shift device 200 will be mainly described hereinafter.

The second shift motor 210 may receive power from the outside of the transmission apparatus 10 and rotate to engage the second shift device 200 with the synchronization device 300 to perform a gear shift operation.

The second rotation shaft 220 may be connected to the second shift motor 210 and rotate about a rotation axis according to forward and reverse rotations of the second shift motor 210. For example, as illustrated in FIGS. 1 and 2, the second rotation shaft 220 may be parallel to and spaced apart from the first rotation shaft 120 in one direction, for example, in the y-axis direction of FIG. 1. In addition, the second rotation shaft 220 may be at the same position as the first rotation shaft 120 in the x-axis direction and the z-axis direction.

When the second rotation shaft 220 rotates, the second movement block 230 engaged with a gear of the second rotation shaft 220 moves. For example, when the second rotation shaft 220 rotates clockwise or counterclockwise about a rotation axis ax2, the second movement block 230 moves forward and backward.

The second movement block 230 may be connected to the second shift fork 240. As illustrated in FIGS. 1 and 2, the second movement block 230 may be on the second shift fork 240 and protrude toward the second rotation shaft 220. In one embodiment, the first movement block 130 and the second movement block 230 may extend in different directions. More specifically, as illustrated in FIG. 1, the first shift fork 140 and the second shift fork 240 may be between the first rotation shaft 120 and the second rotation shaft 220. In addition, the first movement block 130 may protrude in the −y-axis direction toward the first rotation shaft 120, and the second movement block 230 may protrude in the +y-axis direction toward the second rotation shaft 220.

As described above, by placing a pair of movement blocks and a pair of shift forks between a pair of rotation shafts, a total size of a shift device and a transmission may be reduced in a width direction. In addition, an operation of another shift device may not be affected by one shift device.

The second shift fork 240 engages with the synchronization device 300 according to operations of the second rotation shaft 220 and the second movement block 230. For example, as illustrated in FIGS. 1 and 2, as the second movement block 230 moves in the +x-axis direction, the second shift fork 240 also moves in the same direction. Accordingly, the second sleeve 330 supported by the second shift fork 240 engages with a second shift gear 340, and thus, a gear shift operation is completed. In addition, when the second movement block 230 moves in an opposite direction again, the second sleeve 330 is separated from the synchronization device 300, and thus, a transmission state is terminated.

The second decelerator 250 may be mounted in the second shift motor 210 and increase an output torque by reducing a rotation speed of the second shift motor 210.

In one embodiment, a first gear shift by which the first shift device 100 engages with the synchronization device 300 may have a transmission ratio different from a second gear shift by which the second shift device 200 engages with the synchronization device 300. For example, the second gear shift may have a greater number of revolutions and a lower output torque than the first gear shift. Alternatively, the second gear shift may have a smaller number of rotations and a higher output torque than the first gear shift.

The synchronization device 300 performs a gear shift operation in conjunction with the first shift device 100 and the second shift device 200. As illustrated in FIGS. 1 to 3, the synchronization device 300 is connected to an input shaft i and includes the first sleeve 310, the first transmission gear 320, the second sleeve 330, and the second transmission gear 340.

The first sleeve 310 is supported by the first shift fork 140. The first shift fork 140 has a protrusion 141, and the protrusion 141 is inserted into a fixed groove 311 of the first sleeve 310. Accordingly, the first sleeve 310 moves integrally with the first shift fork 140. When the first shift fork 140 moves to the left side of FIG. 3, the first sleeve 310 engages with the first transmission gear 320, and accordingly, a gear shift operation is performed. In addition, when the first shift fork 140 moves to the right of FIG. 3, the first sleeve 310 is separated from the first transmission gear 320, and accordingly, the transmission is released.

Likewise, the second sleeve 330 is supported by the second shift fork 240. The second shift fork 240 has a protrusion 241, and the protrusion 241 is inserted into the fixed groove 331 of the second sleeve 330. Accordingly, the second sleeve 330 moves integrally with the second shift fork 240. When the second shift fork 240 moves to the right side of FIG. 3, the second sleeve 330 engages with the second transmission gear 340, and accordingly, a gear shift operation is performed. In addition, when the second shift fork 240 moves to the left of FIG. 3, the second sleeve 330 is separated from the second transmission gear 340, and accordingly, the transmission is released.

The transmission apparatus 10 may further include a shift rail 400. As illustrated in FIGS. 1 to 3, one side of the shift rail 400 is inserted into the first shift fork 140, and the other side of the shift rail 400 is inserted into the second shift fork 240, and the shift rail 400 extends in parallel to the rotation axis ax1 and the rotation axis ax2. Accordingly, the first shift fork 140 and the second shift fork 240 may not be respectively dislocated from the first movement block 130 and the second movement block 230, and thus, it is possible to prevent jamming or bending that is not smooth between gears.

Next, an operation of the transmission apparatus 10 according to an embodiment of the present disclosure will be described with reference to FIGS. 4 and 5.

As illustrated in FIG. 4, when the first shift motor 110 supplies a power for the first gear shift, the first rotation shaft 120 rotates in one direction, and the first movement block 130 engaged with the first rotation shaft 120 moves in the −x-axis direction toward the synchronization device 300. In addition, the first shift fork 140 connected to the first movement block 130 moves in the same direction, and the first sleeve 310 connected to the first shift fork 140 engages with the first transmission gear 320, and accordingly, a first gear shift is completed.

Thereafter, when the first rotation shaft 120 rotates in an opposite direction to release the first gear shift, the first movement block 130 and the first shift fork 140 are separated from the synchronization device 300, and the first sleeve 310 is separated from the first transmission gear 320, and accordingly, the first gear shift is terminated.

In addition, as illustrated in FIG. 5, when the second shift motor 210 supplies a power for the second gear shift, the second rotation shaft 220 rotates in one direction, and the second movement block 230 engaged with the second rotation shaft 220 moves in the +x-axis direction toward the synchronization device 300. In addition, the second shift fork 240 connected to the second movement block 230 moves in the same direction, and the second sleeve 330 connected to the second shift fork 240 engages with the second transmission gear 340, and accordingly, the second gear shift is completed.

Thereafter, when the second rotation shaft 220 rotates in an opposite direction to release the second gear shift, the second movement block 230 and the second shift fork 240 are separated from the synchronization device 300, the second sleeve 330 is separated from the second transmission gear 340, and accordingly, the second gear shift is terminated.

The transmission apparatus 10 for an electric vehicle according to an embodiment of the present disclosure smoothly performs a second gear shift operation by moving a shift fork in conjunction with a rotation shaft and a movement block.

The transmission apparatus 10 for an electric vehicle according to an embodiment of the present disclosure may obtain a self-locking effect by using a rotation shaft that is a worm gear and a movement block that is a rack gear and may prevent a reversal phenomenon occurring in a gear shift process.

The transmission apparatus 10 for an electric vehicle according to an embodiment of the present disclosure may prevent a shift fork from being jammed or bent by a shift rail.

The technologies described in the embodiments are examples and do not limit the technical scopes of the embodiments. In order to concisely and clearly describe the descriptions of the present disclosure, descriptions of the known general technologies and configurations may be omitted. In addition, the connections or connection members of the lines between the components illustrated in the drawings exemplify functional connections and/or physical or circuit connections, and may be replaced in an actual device or represented by various additional functional connections, physical connections, or circuit connections. In addition, unless there are specific descriptions, such as "essential", "importantly", and so on, those may not be necessary components for the present disclosure.

The "above" or similar terms in the description and the claims of the present disclosure may refer to both the singular and the plural unless otherwise specified. In addition, when a range is described in the embodiment, the range includes the disclosure to which individual values belonging to the range are applied (when there is no description to the contrary), and the range is the same as each individual value constituting the range in the description of the disclosure. In addition, unless there is a clear description on an order of the steps constituting the method according to the embodiment or there is no description to the contrary, the steps may be performed in any suitable order. The embodiments are not limited according to the order of description of the above steps. All examples or example terminologies (for example, and so on) in the embodiments are merely for describing the embodiments in detail, and unless it is limited by the claims, the scopes of the embodiments are not limited by the examples or the example terminologies. In addition, those skilled in the art will recognize that various modifications, combinations, and changes may be made according to design conditions and factors within the scope of the appended claims or their equivalents.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A transmission apparatus for an electric vehicle, the transmission apparatus comprising:
   a synchronization device;
   a first shift device selectively engaged with the synchronization device to perform a gear shift operation;
   a second shift device operated independently of the first shift device and selectively engaged with the synchronization device to perform a gear shift operation; and
   a shift rail between the first shift device and the second shift device,
   wherein the synchronization device comprises:
      a first shift gear and a second shift gear at both ends in a longitudinal direction of the synchronization device; and
      a first sleeve and a second sleeve which are selectively engaged with the first shift gear and the second shift gear respectively,
   wherein the first shift device comprises:
      a first shift motor;
      a first rotation shaft rotated by the first shift motor and having gear teeth on an outer circumferential surface thereof;
      a first movement block inserted into the shift rail and having gear teeth engaged with the gear teeth of the first rotation shaft, and moving along the shift rail according to rotation of the first rotation shaft; and
      a first shift fork connected to the first movement block to move integrally and the first sleeve, and moved by the first movement block to perform a gear shift operation by engaging the first sleeve to the first shift gear, wherein the second shift device comprises:
- a second shift motor;
- a second rotation shaft rotated by the second shift motor and having gear teeth on an outer circumferential surface thereof;
- a second movement block inserted into the shift rail and having gear teeth engaged with the gear teeth of the second rotation shaft, and moving along the shift rail according to rotation of the second rotation shaft; and
- a second shift fork connected to the second movement block and the second sleeve, and moved by the second movement block to perform a gear shift operation by engaging the second sleeve to the second shift gear, wherein the shift rail is inserted into the first shift fork and the second shift fork, wherein the first rotation shaft and the second rotation shaft are disposed in parallel on opposite sides of the shift rail, wherein the first movement block and the second movement block are arranged so that the gear teeth face opposite to each other.

* * * * *